United States Patent
Pei et al.

(10) Patent No.: US 9,871,685 B2
(45) Date of Patent: Jan. 16, 2018

(54) TRANSFORMATION BETWEEN TIME DOMAIN AND FREQUENCY DOMAIN BASED ON NEARLY ORTHOGONAL FILTER BANKS

(71) Applicant: Harman International Industries, Inc, Stamford, CT (US)

(72) Inventors: Wenjiang Pei, Jiangsu (CN); Jinguang Hao, Jiangsu (CN); Kai Wang, Jiangsu (CN); Jianjun Ma, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 115 days.

(21) Appl. No.: 14/773,320

(22) PCT Filed: May 2, 2013

(86) PCT No.: PCT/CN2013/075082
§ 371 (c)(1),
(2) Date: Sep. 4, 2015

(87) PCT Pub. No.: WO2014/176774
PCT Pub. Date: Nov. 6, 2014

(65) Prior Publication Data
US 2016/0043886 A1    Feb. 11, 2016

(51) Int. Cl.
| H04J 11/00 | (2006.01) |
| G02F 2/00 | (2006.01) |
| H04L 27/00 | (2006.01) |
| H04L 27/26 | (2006.01) |

(52) U.S. Cl.
CPC ........ *H04L 27/264* (2013.01); *H04L 27/2649* (2013.01)

(58) Field of Classification Search
CPC .......................... H04L 27/264; H04L 27/2649
See application file for complete search history.

(56) References Cited

U.S. PATENT DOCUMENTS

| 6,091,704 A * | 7/2000 | Butash | H03H 17/0266 370/210 |
| 8,659,820 B1 * | 2/2014 | Giallorenzi | H03H 17/0266 359/325 |
| 2003/0231714 A1 * | 12/2003 | Kjeldsen | H04B 1/69 375/259 |

FOREIGN PATENT DOCUMENTS

| CN | 101102296 A | 1/2008 |
| CN | 101222468 A | 7/2008 |
| WO | 2010137231 A1 | 2/2010 |

OTHER PUBLICATIONS

Extended European Search Report Application No. 138834489.0, dated Oct. 27, 2016, 9 pages.
(Continued)

*Primary Examiner* — Kiet Tang
(74) *Attorney, Agent, or Firm* — Artegis Law Group, LLP

(57) ABSTRACT

A filter bank for signal decomposition is provided. The filter bank comprises a plurality of filter units each of which has one input and two outputs forming two paths whose transfer functions are complementary to each other, where the plurality of filter units are connected to form a tree structure.

10 Claims, 3 Drawing Sheets

(56) References Cited

OTHER PUBLICATIONS

Lim Y C et al: "Fast Filter Bank (FFB)", IEEE Transactions on Circuits and Systems: Analog and Digitalsignal Processing, Institute of Electrical and Electronics Engineers Inc, 345 East 47 Street, New York, N.Y. 10017. USA, vol. 39, No. 5, May 1, 1992 (May 1, 1992), pp. 316-318, XP080305261, ISSN: 1057-7138, DOI: 18.1189/82. 142033 * Sections I-IV; figures 3-4 *.

Yong Ching Lim et al: "Analysis and optimum design of the FFB",Circuits and Systems, 1994. ISCAS '94.' 1994 IEEE International Sympos IUM on London, UK 38 May-2 Jun. 1994, New York, NY, USA, IEEE, us, vol. 2, 38 May 1994 (1994-05-38), pp. 589-512, XP810143088, ISBN: 978-8-7803-1915-8 * p. 510-p. 511; figure 4 *.

Lee Jun Wei et al: "A Multiplierless Filter Bank with Deep Stopband Suppression and Narrow Transition Width", Conference Proceedings / IEEE International Symposium on Circuits and Systems (ISCAS) : May 23-26, 2005, International Conference Center, Kobe, Japan, IEEE Service Center, Piscataway, NJ, May 23, 2005 (May 23, 2005), pp. 4305-4308, XP010816613, ISBN: 978-0-7803-8834-5 * Section 11-IV; figures 2-3 *.

Yong Ching Lim et al: "Matrix, formulation: fast filter bank", Acoustics, Speech, and Signal Processing, 2004. Proceedings. (ICASSP ' 04). IEEE International Conference on Montreal, Quebec, Canada May 17-21, 2004, Piscataway, NJ, USA,IEEE, Piscataway, NJ, USA, vol. 5, May 17, 2004 (May 17, 2004), pp. 133-136, XP010718880, ISBN: 978-0-7803-8484-2 * Sections 2-4; figures 1-3 *.

International Search Report Application No. PCT/CN2013/075082, dated Feb. 6, 2013.

Budiarjo, et al., "Cognitive Radio Modulation Techniques", IEEE Signal Processing Magazine, IEEE Service Center, Piscataway, NJ, US, vol. 25, No. 6, Nov. 2008, pp. 24-34.

Extended European Search Report for Application No. 13883489.0 dated Feb. 10, 2017.

* cited by examiner

TRANSFORMATION BETWEEN TIME DOMAIN AND FREQUENCY DOMAIN BASED ON NEARLY ORTHOGONAL FILTER BANKS

CROSS-REFERENCE TO RELATED APPLICATIONS

The present application is a national stage application of international patent application PCT/CN2013/075082 titled, "TRANSFORMATION BETWEEN TIME DOMAIN AND FREQUENCY DOMAIN BASED ON NEARLY ORTHOGONAL FILTER BANKS," filed on May 2, 2013. The subject matter of this related application is hereby incorporated herein by reference.

TECHNICAL FIELD

The present application generally relates to a communication system based on nearly orthogonal filter banks.

BACKGROUND

Signal decomposition and composition are usually carried out based on Fast Fourier Transform (FFT) and Inverse Fast Fourier Transform (IFFT), respectively. However, these methods based on FFT and IFFT is sensitive to channel noise, carrier frequency offset, and Doppler effect. Therefore, new signal decomposition and composition methods are needed.

SUMMARY

In one embodiment, a filter bank for signal decomposition is provided. The filter bank includes a plurality of filter units having one input and two outputs which forms two paths whose transfer functions are complementary to each other, where the plurality of filter units are connected to form a tree structure.

In some embodiments, the filter bank is for decomposing signals containing $N_c$ sub-carrier signals. The filter bank includes $N_s$ stages and stage s includes $2^s$ levels, where $N_s = \log_2 N_c$, s stands for stage number, and $s \in [0, 1 \ldots N_s-1]$.

In some embodiments, two outputs of $s^{th}$ stage $l^{th}$ level filter unit are respectively connected to inputs of $(s+1)^{th}$ stage $(2l)^{th}$ level filter unit and $(s+1)^{th}$ stage $(2l+1)^{th}$ level filter unit, where $l \in [0, 1 \ldots 2^s-1]$.

In some embodiments, $n^{th}$ order impulse response coefficient of $s^{th}$ stage $q^{th}$ level filter unit $h_{s,q}(n)$ can be calculated by multiplying $n^{th}$ order impulse response coefficient of $s^{th}$ stage $p^{th}$ level filter unit $h_{s,p}(n)$ and a rotation factor, where $p \in [0, 1 \ldots 2^s-1]$, and $q \in [0, 1 \ldots 2^s-1]$, where the rotation factor is a complex exponential factor.

In some embodiments, impulse response coefficients of $s^{th}$ stage $q^{th}$ level filter unit can be calculated according to below equation:

$$h_{s,q}(n) = h_{s,p}(n) \cdot W_{N_c}^{-n(\tilde{p}-\tilde{q})}$$

where $h_{s,q}(n)$ represents $n^{th}$ order impulse response coefficient of $s^{th}$ stage $q^{th}$ level filter unit, $h_{s,p}(n)$ represents $n^{th}$ order impulse response coefficient of $s^{th}$ stage $p^{th}$ level filter unit, $$W_{N_c}^{-n(\tilde{p}-\tilde{q})} = e^{j\frac{2\pi}{N_c}(\tilde{p}-\tilde{q})}$$

where $\tilde{p}$ is the value of bit reversed version of $N_s-1$ bits binary encode of p, $\tilde{q}$ is the value of bit reversed version of $N_s-1$ bits binary encode of q.

In one embodiment, a filter bank for signal composition is provided. The filter bank includes a plurality of filter units having two inputs and one output which forms two paths whose transfer functions are complementary to each other, where the plurality of filter units are connected to form a tree structure.

In some embodiments, the filter bank is for composing signals containing $N_c$ sub-carrier signals. The filter bank includes $N_s$ stages and stage s includes $2^s$ levels, where $N_s = \log_2 N_c$, s stands for stage number, and $s \in [0, 1 \ldots N_s-1]$.

In some embodiments, two inputs of $s^{th}$ stage $l^{th}$ level filter unit are respectively connected to output of $(s+1)^{th}$ stage $(2l)^{th}$ level filter unit and output of $(s+1)^{th}$ stage $(2l+1)^{th}$ level filter unit, where $l \in [0, 1 \ldots 2^s-1]$.

In some embodiments, $n^{th}$ order impulse response coefficient of $s^{th}$ stage $q^{th}$ level filter unit $h_{s,q}(n)$ can be calculated by multiplying $n^{th}$ order impulse response coefficient of $s^{th}$ stage $p^{th}$ level filter unit $h_{s,p}(n)$ and a rotation factor, where $p \in [0, 1 \ldots 2^s-1]$, and $q \in [0, 1 \ldots 2^s-1]$, where the rotation factor is a complex exponential factor.

In some embodiments, impulse response coefficients of $s^{th}$ stage $q^{th}$ level filter unit can be calculated according to below equation:

$$h_{s,q}(n) = h_{s,p}(n) \cdot W_{N_c}^{-n(\tilde{p}-\tilde{q})} = h_{s,p}(n) \cdot e^{j\frac{2\pi}{N_c}n(\tilde{p}-\tilde{q})}$$

where $h_{s,q}(n)$ represents $n^{th}$ order impulse response coefficient of $s^{th}$ stage $q^{th}$ level filter unit, $h_{s,p}(n)$ represents $n^{th}$ order impulse response coefficient of $s^{th}$ stage $p^{th}$ level filter unit, $\tilde{p}$ stands for the value of bit reversed version of $N_s-1$ bits binary encode of p, $\tilde{q}$ stands for the value of bit reversed version of $N_s-1$ bits binary encode of q.

In one embodiment, a receiver is provided. The receiver includes a first filter bank for decomposing signals composed by a second filter bank of a transmitter which signals contain $N_c$ sub-carrier signals. The first filter bank includes $N_c$ channels corresponding to the $N_c$ sub-carriers. The second filter bank also includes $N_c$ channels corresponding to the $N_c$ sub-carriers. Vector form transfer function of channel p of the first filter bank is nearly orthogonal to vector form transfer function of channel q of the second filter bank.

In some embodiments, when p=q, the result of $[\vec{H}_{t,q}]^H \cdot \vec{H}_{r,p}$ substantially equals to 1; when $|p-q|=1$, the result of $[\vec{H}_{t,q}]^H \cdot \vec{H}_{r,p}$ is less than a predetermined threshold; otherwise $[\vec{H}_{t,q}]^H \cdot \vec{H}_{r,p} = 0$, where $[\ ]^H$ stands for conjugate transpose operation, where the predetermined threshold is small enough such that a signal composed by the transmitter can be decomposed by the receiver correctly, where the result of $[\vec{H}_{t,q}]^H \cdot \vec{H}_{r,p}$ is normalized. When p=q, the result of $[\vec{H}_{t,q}]^H \cdot \vec{H}_{r,p}$ is not required to be exactly equal to 1, instead it is required to be close enough to 1 such that the $N_c$ sub-carrier signals can be decomposed correctly.

In some embodiments, the threshold may be determined based on modulation method used by the transmitter.

In one embodiment, a signal composing method is provided. The method may include: feeding $N_c$ sub-carrier signals into $N_c$ inputs of a tree structured filter bank, respectively, where the filter bank has a plurality of filter units having two inputs and one output which forms two paths whose transfer functions are complementary to each other; and obtain a composed signal containing the $N_c$ sub-carrier signals from an output of the filter bank.

In one embodiment, a signal decomposing method is provided. The method may include: feeding a signal containing $N_c$ sub-carrier signals into a tree structured filter bank having one input and $N_c$ outputs, where the filter bank has a plurality of filter units having one input and two outputs which forms two paths whose transfer functions are complementary to each other; and obtain the $N_c$ sub-carrier signals from the $N_c$ outputs of the filter bank, respectively.

In one embodiment, a communication method is provided. The method may include: composing $N_c$ sub-carrier signals using a first tree structured filter bank having $N_c$ channels to obtain a composed signal containing the $N_c$ sub-carrier signals; and decomposing the composed signal using a second tree structured filter bank having $N_c$ channels to obtain the $N_c$ sub-carrier signals, where vector form transfer function of channel q of the first filter bank is nearly orthogonal to vector form transfer function of channel p of the second filter bank.

In some embodiments, when p=q, the result of $[\vec{H}_{t,q}]^H \cdot \vec{H}_{r,p}$ substantially equals to 1; when |p−q|=1, the result of $[\vec{H}_{t,q}]^H \cdot \vec{H}_{r,p}$ is less than a predetermined threshold; otherwise $[\vec{H}_{t,q}]^H \cdot \vec{H}_{r,p} = 0$, where $\vec{H}_{t,q}$ is vector form transfer function of channel q of the first filter bank and $\vec{H}_{r,p}$ is vector form transfer function of channel p of the second filter bank, where $[\ ]^H$ stands for conjugate transpose operation, where the predetermined threshold is small enough such that the $N_c$ sub-carrier signals composed by the first filter bank can be decomposed by the second filter bank correctly, where the result of $[\vec{H}_{t,q}]^H \cdot \vec{H}_{r,p}$ is normalized.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
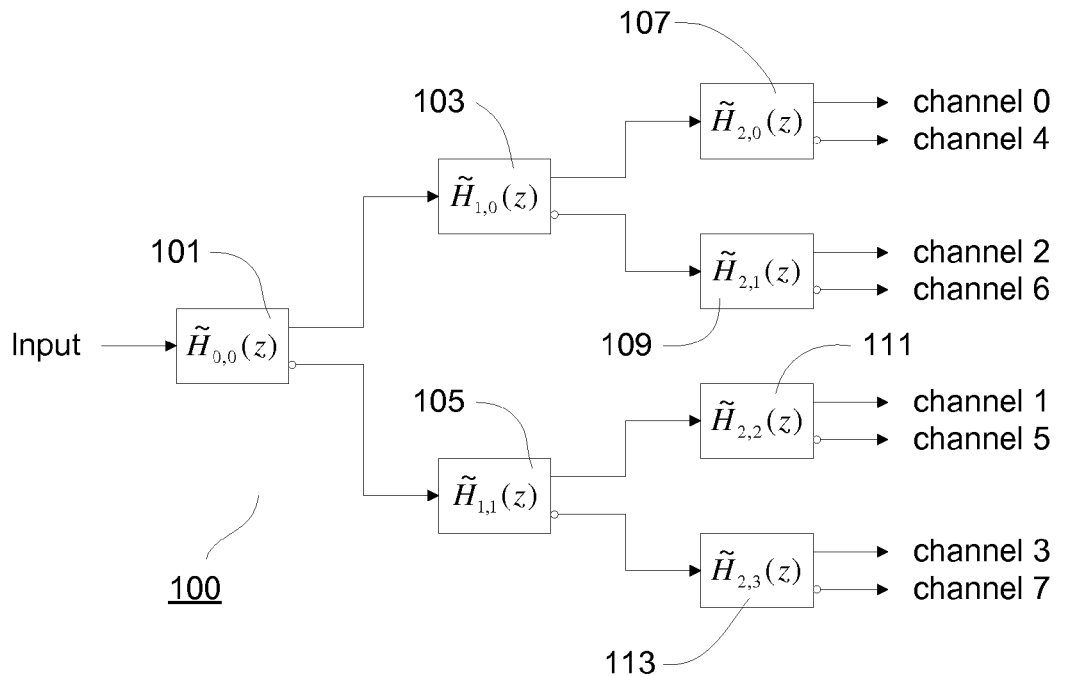
FIG. 1 illustrates a schematic block diagram of a filter bank for signal decomposition in one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Referring to FIG. 1, a three stage filter bank 100 for decomposing signals containing eight sub-carrier signals is illustrated. The filter bank 100 includes three stages. The $0^{th}$ stage includes one filter unit 101, the $1^{st}$ stage includes two filter units 103 and 105, and the $2^{nd}$ stage includes four filter units 107, 109, 111, and 113. Each of the filter units includes one input and two outputs which form two paths. The filter bank 100 as a whole includes one input and eight outputs, in other words, the filter bank 100 includes eight channels.

A filter bank for decomposing signals having $N_c$ sub-carrier signals includes $N_s = \log_2 N_c$ stages, stage s includes $2^s$ filter units/levels, where s stands for stage number.

Figure 2:
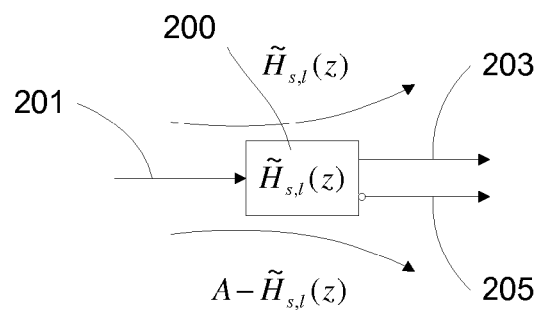
FIG. 2 illustrates a schematic block diagram of a filter unit of the filter bank in FIG. 1.

Referring to FIG. 2, the $s^{th}$ stage $l^{th}$ level filter unit 200 has an input 201 and two outputs 203 and 205, which form an upper path and a lower path. Given the frequency domain transfer function of the upper path is $\tilde{H}_{s,l}(z)$, then the frequency domain transfer function of the lower path shall be $A - \tilde{H}_{s,l}(z)$, these two transfer functions are complementary to each other, where A represents a magnitude, z stands for z-transform i.e. $z = e^{j\varphi}$, where $j = \sqrt{-1}$.

Channel number c may be binary encoded, $[c]_{10} = [B_{N_s-1} B_{N_s-2} \ldots B_0]_2$, where $B_{N_s-1}$ is the most significant bit (MSB), and $B_0$ is the least significant bit (LSB). For example, referring to FIG. 1, the channel number of "channel 4" is four.

Given the frequency domain transfer function of the $s^{th}$ stage $0^{th}$ level filter unit is written as Equation (1), $$\tilde{H}_{s,0}(z) = h_s(0) + \sum_{n=1}^{M_s-1} h_s(n) z^{-n} \qquad \text{Equation (1)}$$

where $M_s - 1$ represents order of transfer functions in $s^{th}$ stage, and $h_s(0), h_s(1) \ldots h_s(n)$ are impulse response coefficients of the transfer function of $s^{th}$ stage $0^{th}$ level filter unit, then the frequency domain transfer function of channel c in $s^{th}$ stage may be written as Equation (2), $$\tilde{H}_c^s = h_s(0) + \sum_{n=1}^{M_s-1} (-1)^{B_s} h_s(n) W_{N_c}^{nk} z^{-n 2^{N_s-s-1}} \qquad \text{Equation (2)}$$

where $B_s$ stands for the $s^{th}$ element/bit of the binary encode of the channel number c, $N_c$ stands for the sum of channels in the communication system, $N_s$ stands for the sum of stages in the signal decomposition system, for example, assuming $N_c=8$, s=2, and c=6, the binary encode of c is 110, then $B_s$ is the $2^{nd}$ element of 110 which is 1, where $0^{th}$ element of a binary encode $e_2 e_1 e_0$ is e0, $1^{st}$ element of $e_2 e_1 e_0$ is $e_1$, and $2^{nd}$ element of $e_2 e_1 e_0$ is $e_2$, $$W_{N_c}^{nk} = e^{-j\frac{2\pi}{N_c}nk},$$

where $$k = k_0 \cdot 2^{N_s - s - 1},$$

where $k_0$ stands for the value of the least s bits of the binary encode of c. For example, assuming $N_s=3$, $s=2$ and $c=6$, the binary encode of c is 110, the least $s=2$ bits of the binary encode of c is 10, and $k_0=2$ in this example. When $s=0$, $k_0=0$.

For channel c, when its frequency domain transfer function in each stage is obtained, the channel transfer function $\tilde{H}z_c$ in the frequency domain may be written as:

$$\tilde{H}z_c = H_1 \cdot \tilde{H}_c^0 \cdot \tilde{H}_c^1 \ldots \cdot H_c^{N_s-1} \quad \text{Equation (3),}$$

where $H_1$ may be defined as:

$$H_1 = H_0 = \frac{1}{\sqrt{|h_c(0)|^2 + |h_c(1)|^2 \ldots |h_c(M_c - 1)|^2}} \quad \text{Equation (4)}$$

where $h_c(n)$ is a coefficient of transfer function, $n \in [0, 1 \ldots M_c-1]$, where $M_c-1$ is order of the transfer function of channel c.

Figure 3:
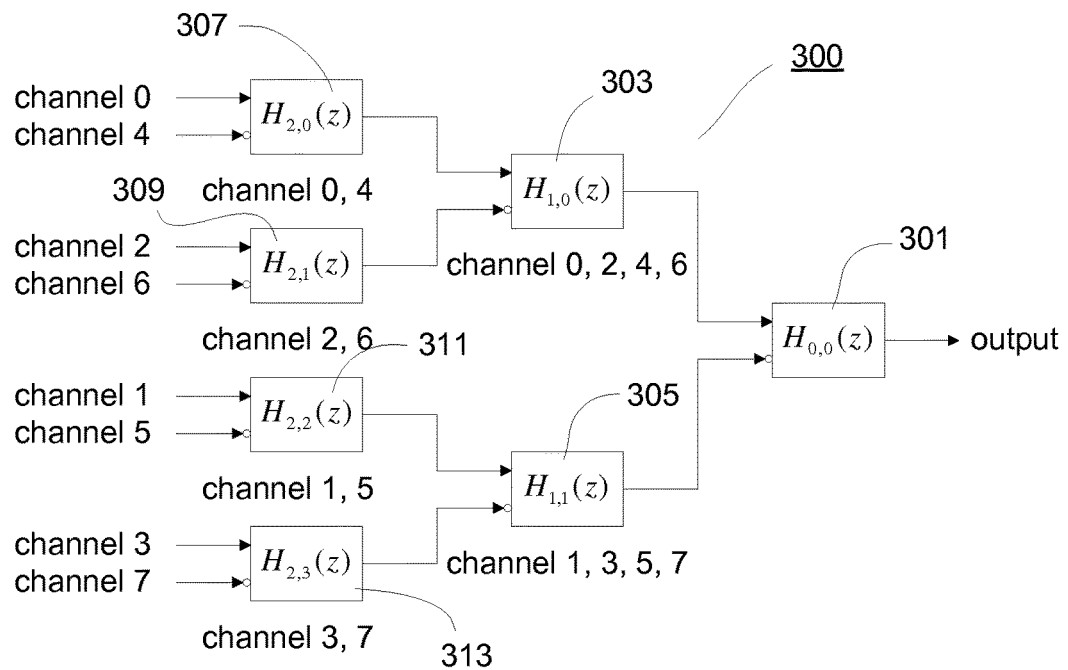
FIG. 3 illustrates a schematic block diagram of a filter bank for signal composition in one embodiment.

Referring to FIG. 3, a three stage filter bank 300 for composing signals having eight sub-carrier signals is illustrated. A signal composed using the filter bank 300 can be decomposed using the filter bank 100. The filter bank 300 also includes three stages. The $0^{th}$ stage includes one filter unit 301, the $1^{st}$ stage includes two filter units 303 and 305, and the $2^{nd}$ stage includes four filter units 307, 309, 311, and 313. Each of the filter units includes one output and two inputs which form two paths. The filter bank 300 as a whole includes one output and eight inputs, in other words, the filter bank 300 also includes eight channels.

A filter bank for composing $N_c$ sub-carrier signals into one signal containing the $N_c$ sub-carrier signals includes $N_s = \log_2 N_c$ stages, stage s includes $2^s$ filter units/levels, and each filter unit includes two inputs which form two paths whose transfer functions are complementary to each other. Its structure is substantially inverse to that of a filter bank for decomposing signals composed by it.

Assuming the frequency domain transfer function of channel c in the filter bank 100 may be written as:

$$\tilde{H}z_c = \alpha \cdot [h_c(0) + \Sigma_{n=1}^{M_c-1} h_c(n) z^{-n}] \quad \text{Equation (5),}$$

where α may be defined as:

$$\alpha = \frac{1}{\sqrt{|h_c(0)|^2 + |h_c(1)|^2 \ldots |h_c(M_c - 1)|^2}}. \quad \text{Equation (6)}$$

For simplicity, the transfer function of channel c in the filter bank 100 may be re-written in vector form as:

$$\vec{H}_{r,c} = \alpha \cdot [h_c(0), h_c(1) \ldots h_c(M_c-1)]^T \quad \text{Equation (7)}$$

where $[\ ]^T$ stands for transpose operation.

The transfer function of channel c in the filter bank 300 may be re-written in vector form as:

$$\vec{H}_{t,c} = \vec{H}^*_{r,c} = \alpha \cdot [h_c(0), h_c(1) \ldots h_c(M_c-1)]^H \quad \text{Equation (8),}$$

where $[\ ]^*$ stands for conjugate operation, and $[\ ]^H$ stands for conjugate transpose operation. As a result, the following Equation (9) may be obtained:

$$\vec{H}^H_{t,c} \cdot \vec{H}_{r,c} = 1 \quad \text{Equation (9).}$$

In a signal composition system of a transmitter, if a symbol $X_c$ is fed to a channel c having a transfer function of $\vec{H}_{t,c}$, then a symbol $X_c \cdot \vec{H}_{t,c}$ may be generated by the channel c. Since the transmitted symbol X is constituted by symbols generated by all channels, the transmitted symbol X may be written as:

$$X = X_1 \cdot \vec{H}_{t,1} + X_2 \cdot \vec{H}_{t,2} \ldots X_{N_c-1} \cdot \vec{H}_{t,N_c-1} \quad \text{Equation (10).}$$

In a signal decomposition system of a receiver, for a received symbol X, a channel c having a transfer function of $\vec{H}_{r,c}$ may generate a symbol $\tilde{X}_c$ according to Equation (11):

$$\tilde{X}_c = X^T \cdot \vec{H}_{r,c} \quad \text{Equation (11).}$$

According to Equations (9) and (10), Equation (12) may be obtained:

$$\begin{aligned}
\tilde{X}_c &= X^T \cdot \vec{H}_{r,c} \\
&= \left[ \begin{array}{c} X_1 \cdot \vec{H}_{t,1} + \ldots + X_c \cdot \vec{H}_{t,c} + \ldots \\ X_{N_c-1} \cdot \vec{H}_{t,N_c-1} \end{array} \right]^T \cdot \vec{H}_{r,c} \\
&= X_1 \cdot \vec{H}^T_{t,1} \cdot \vec{H}_{r,c} + \ldots + X_c \cdot \vec{H}^T_{t,c} \cdot \vec{H}_{r,c} + \ldots \\
&\quad X_{N_c-1} \cdot \vec{H}^T_{t,N_c-1} \cdot \vec{H}_{r,c} \\
&= X_1 \cdot \vec{H}^T_{t,1} \cdot \vec{H}_{r,c} + \ldots + X_c + \ldots X_{N_c-1} \cdot \\
&\quad \vec{H}^T_{t,N_c-1} \cdot \vec{H}_{r,c}.
\end{aligned} \quad \text{Equation (12)}$$

Then Equation (13) may be obtained:

$$\tilde{X}_c - X_c = X_1 \cdot \vec{H}_{t,1}^T \cdot \vec{H}_{r,c} + \ldots + X_{c-1} \cdot \vec{H}_{t,c-1}^T \cdot \vec{H}_{r,c} + X_{c+1} \cdot \vec{H}_{t,c+1}^T \cdot \vec{H}_{r,c} + \ldots + X_{N_c-1} \cdot \vec{H}_{t,N_c-1}^T \cdot \vec{H}_{r,c} \quad \text{Equation (13),}$$

where the items on the right of the equation may be called interference items.

To guarantee that $\tilde{X}_c - X_c$ is equal to zero, vector $\vec{H}_{r,p}$ of the receiver shall be orthogonal to vector $\vec{H}_{t,q}$ of the transmitter. However, in practice, perfect orthogonality is very difficult to achieve. If nearly orthogonality is achieved, symbols can also be decomposed correctly.

EXAMPLE

Figure 4:
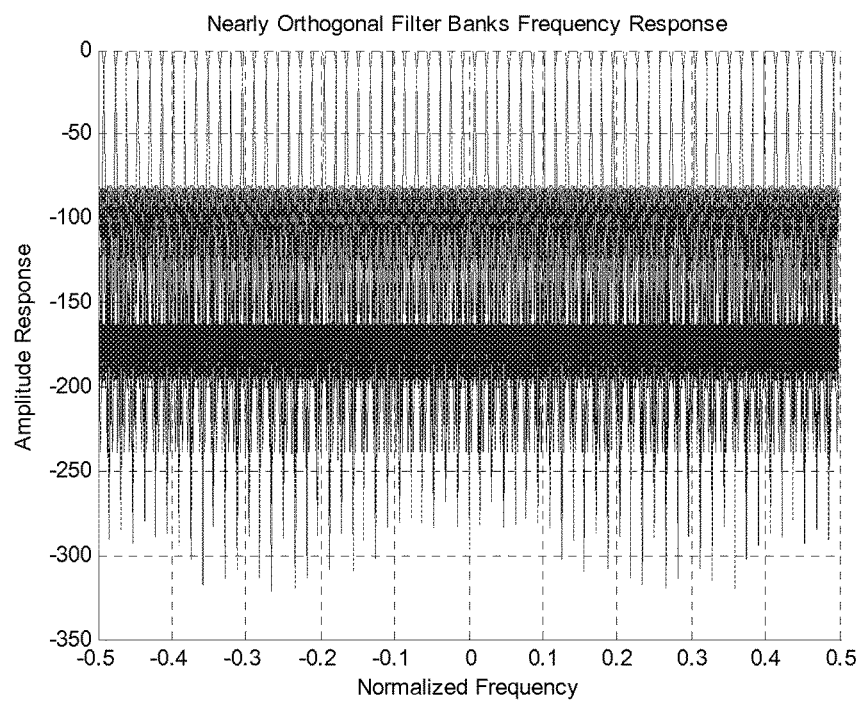
FIG. 4 illustrates a spectrum obtained in one experiment using a communication system of one embodiment.

A communication system having 64 sub-carriers based on filter banks of the present application was designed, and FIG. 4 illustrates a spectrum of the communication system.

Figure 5:
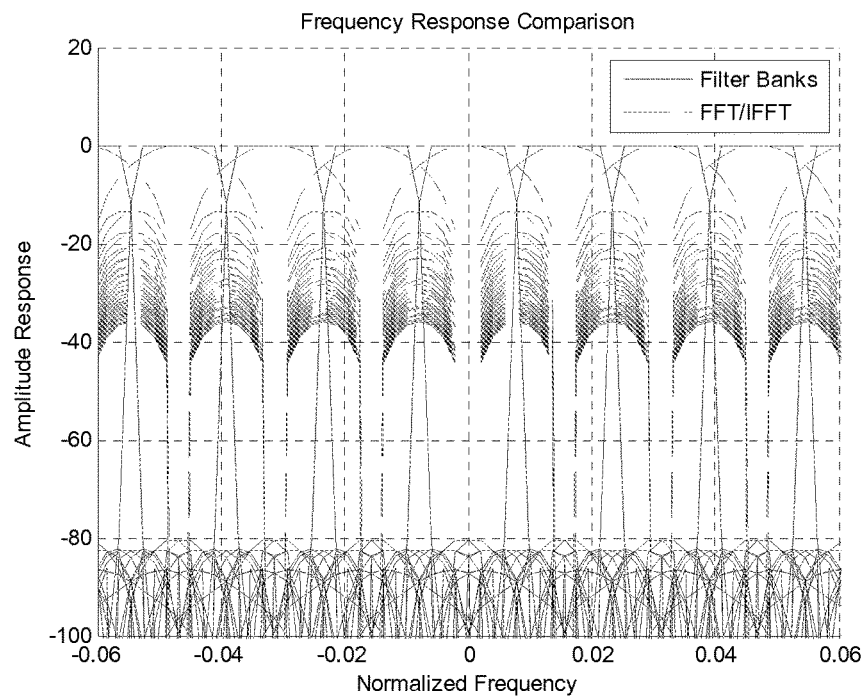
FIG. 5 illustrates an enlarged view of the spectrum in FIG. 4 and a spectrum of a conventional communication system based on FFT/IFFT.

Referring to FIG. 5, an enlarged view of the spectrum of the communication system based on filter banks and a spectrum of conventional FFT/IFFT method is shown. It can be seen that the communication system has the following characteristics: flat-pass band, narrow transition band, small interference between adjacent sub-carriers and large attenuation in the stop-band etc.

Given that $\vec{H}_{r,p}$ is the vector of the $p^{th}$ channel of the receiver and $\vec{H}_{t,q}$ is the vector of the $q^{th}$ channel of the transmitter. In this example, results of multiplication of the two arbitrary vectors are listed below:

$$[\vec{H}_{t,q}]^H \cdot \vec{H}_{r,p} = \begin{cases} 1, & p = q \\ 0.0362, & |p - q| = 1 \\ 0, & \text{others} \end{cases}.$$

Since when p=q, the result of $[\vec{H}_{t,q}]^H \cdot \vec{H}_{r,p}$ is substantially equal to 1; when |p−q|=1, the result of $[\vec{H}_{t,q}]^H \cdot \vec{H}_{r,p}$ is less than 0.0362 which is small enough to be negligible; otherwise the result of $[\vec{H}_{t,q}]^H \cdot \vec{H}_{r,p}$ equals to zero, then $\vec{H}_{t,q}$ and $\vec{H}_{r,p}$ may be regarded as nearly orthogonal. In this example, 1 and 0.0362 is the result of normalization.

In other words, as long as the above conditions are met, the receiver can decode symbols correctly. To decompose sub-carrier signals correctly, when |p−q|=1, the result of $[\vec{H}_{t,q}]^H \cdot \vec{H}_{r,p}$ shall be less than a certain threshold, and the threshold may be determined based on how the signal containing the sub-carrier signals is modulated in the transmitter.

Figure 6:
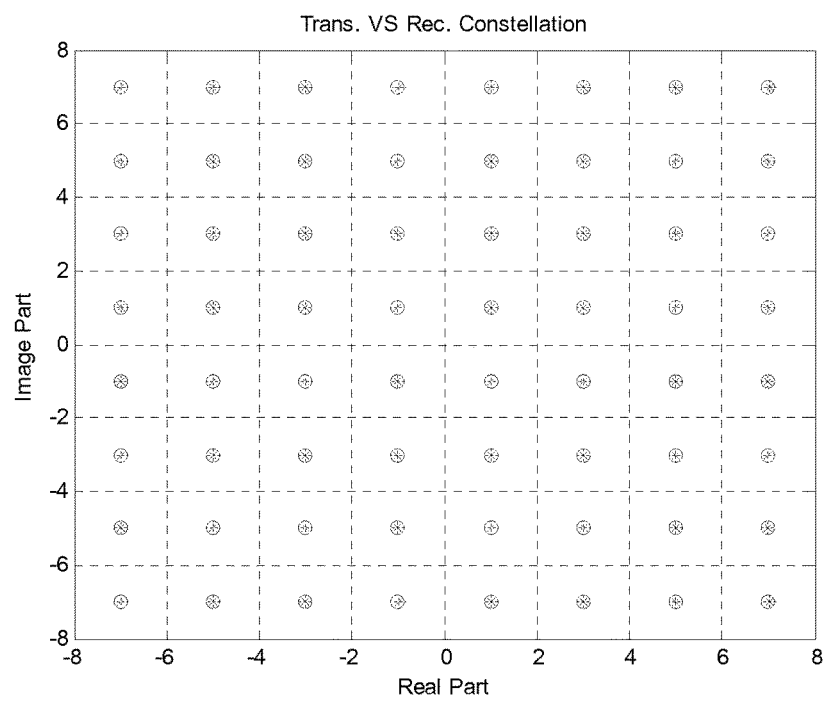
FIG. 6 illustrates a comparison between original signals and decoded signals, according to various embodiments of the present disclosure.

Referring to FIG. 6, differences between original symbols and decoded symbols are shown, where original symbols are represented using symbol "o", and decoded symbols are represented using symbol "*". It can be seen that the symbols were correctly decoded.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A filter bank for signal decomposition, comprising:
a plurality of filter units having one input and two outputs, wherein the two outputs comprise two paths that have complementary transfer functions, and wherein the plurality of filter units are connected to one another to form a tree structure,
wherein the filter bank decomposes signals having $N_c$ sub-carrier signals, the filter bank having $N_s$ stages, stage s having $2^s$ levels, wherein $N_s=\log_2 N_c$, s is a stage number, and $s \in [0, 1 \ldots N_s-1]$,
wherein an $n^{th}$ order impulse response coefficient of an $s^{th}$ stage, $q^{th}$ level filter unit, $h_{s,q}(n)$, is calculated by multiplying an $n^{th}$ order impulse response coefficient of $s^{th}$ stage, $p^{th}$ level filter unit, $h_{s,p}(n)$, and a rotation factor, wherein the rotation factor is a complex exponential factor, and
wherein the rotation factor is $$e^{j\frac{2\pi}{N_c}(\tilde{p}-\tilde{q})},$$

wherein $\tilde{p}$ is a first value of a first bit reversed version of a first $N_s-1$ bits binary encode of p, and $\tilde{q}$ is a second value of a second bit reversed version of a second $N_s-1$ bits binary encode of q.

2. The filter bank of claim 1, wherein two outputs of an $s^{th}$ stage, $l^{th}$ level filter unit are respectively connected to inputs of an $(s+1)^{th}$ stage, $(2l)^{th}$ level filter unit and an $(s+1)^{th}$ stage, $(2l+1)^{th}$ level filter unit, where $l \in [0, 1 \ldots 2^s-1]$.

3. A filter bank for signal composition, comprising:
a plurality of filter units having one output and two inputs, wherein the two inputs comprise two paths that have complementary transfer functions, and wherein the plurality of filter units are connected to one another to form a tree structure,
wherein the filter bank composes signals having $N_c$ sub-carrier signals, the filter bank having $N_s$ stages, stage s having $2^s$ levels, wherein $N_s=\log_2 N_c$, s is a stage number, and $s \in [0, 1 \ldots N_s-1]$,
wherein an $n^{th}$ order impulse response coefficient of an $s^{th}$ stage, $q^{th}$ level filter unit, $h_{s,q}(n)$, is calculated by multiplying an $n^{th}$ order impulse response coefficient of $s^{th}$ stage, $p^{th}$ level filter unit, $h_{s,p}(n)$, and a rotation factor, where the rotation factor is a complex exponential factor, and
wherein the rotation factor is $$e^{j\frac{2\pi}{N_c}(\tilde{p}-\tilde{q})},$$

wherein $\tilde{p}$ is a first value of a first bit reversed version of a first $N_s-1$ bits binary encode of p, and $\tilde{q}$ is a second value of a second bit reversed version of a second $N_s-1$ bits binary encode of q.

4. The filter bank of claim 3, wherein two outputs of an $s^{th}$ stage, $l^{th}$ level filter unit are respectively connected to inputs of an $(s+1)^{th}$ stage, $(2l)^{th}$ level filter unit and an $(s+1)^{th}$ stage, $(2l+1)^{th}$ level filter unit, where $l \in [0, 1 \ldots 2^s-1]$.

5. A receiver, comprising:
a first filter bank for decomposing signals, the signals containing $N_c$ sub-carrier signals and composed by a second filter bank of a transmitter, where both the first filter bank and the second filter bank have $N_s$ stages, and stage s of both the first filter bank and the second filter bank comprises $2^s$ levels to form $N_c$ channels, where $N_s=\log_2 N_c$, s is a stage number, and $s \in [0, 1 \ldots N_s-1]$, and where vector form transfer function $\vec{H}_{r,p}$ of channel p of the first filter bank is orthogonal to vector form transfer function $\vec{H}_{t,q}$ of channel q of the second filter bank.

6. The receiver of claim 5, wherein:
when p=q, the result of $[\vec{H}_{t,q}]^H \cdot \vec{H}_{r,p}$ equals to 1;
when |p−q|=1, the result of $[\vec{H}_{t,q}]^H \cdot \vec{H}_{r,p}$ is less than a predetermined threshold; and
otherwise, the result of $[\vec{H}_{t,q}]^H \cdot \vec{H}_{r,p}$ equals to 0, where $[\ ]^H$ is a conjugate transpose operation.

7. A signal composing method, comprising:
feeding $N_c$ sub-carrier signals into $N_c$ inputs of a tree-structured filter bank, respectively, wherein the filter bank has a plurality of filter units, each filter unit having one output and two inputs, wherein the two inputs comprise two paths that have complementary transfer functions; and
obtaining a composed signal containing the $N_c$ sub-carrier signals from an output of the filter bank,
wherein the filter bank composes signals having $N_c$ sub-carrier signals, the filter bank having $N_s$ stages, stage s having $2^s$ levels, wherein $N_s=\log_2 N_c$, s is a stage number, and $s \in [0, 1 \ldots N_s-1]$,
wherein an $n^{th}$ order impulse response coefficient of an $s^{th}$ stage, $q^{th}$ level filter unit, $h_{s,q}(n)$, is calculated by multiplying an $n^{th}$ order impulse response coefficient of $s^{th}$ stage, $p^{th}$ level filter unit, $h_{s,p}(n)$, and a rotation factor, where the rotation factor is a complex exponential factor, and
wherein the rotation factor is $$e^{j\frac{2\pi}{N_c}(\tilde{p}-\tilde{q})},$$

wherein $\tilde{p}$ is a first value of a first bit reversed version of a first $N_s-1$ bits binary encode of p, and $\tilde{q}$ is a second value of a second bit reversed version of a second $N_s-1$ bits binary encode of q.

8. A signal decomposing method comprising:
feeding a signal containing $N_c$ sub-carrier signals into a tree structured filter bank having one input and $N_c$ outputs, where the filter bank has a plurality of filter units having one input and two outputs, where the two outputs comprise two paths that have complementary transfer functions; and
obtaining the $N_c$ sub-carrier signals from the $N_c$ outputs of the filter bank, respectively,
wherein the filter bank decomposes signals having $N_c$ sub-carrier signals, the filter bank having $N_s$ stages, stage s having $2^s$ levels, wherein $N_s = \log_2 N_c$, s is a stage number, and $s \in [0, 1 \ldots N_s-1]$,
wherein an $n^{th}$ order impulse response coefficient of an $s^{th}$ stage, $q^{th}$ level filter unit, $h_{s,q}(n)$, is calculated by multiplying an $n^{th}$ order impulse response coefficient of $s^{th}$ stage, $p^{th}$ level filter unit, $h_{s,p}(n)$, and a rotation factor, wherein the rotation factor is a complex exponential factor, and
wherein the rotation factor is $$e^{j\frac{2\pi}{N_c}(\tilde{p}-\tilde{q})},$$

wherein $\tilde{p}$ is a first value of a first bit reversed version of a first $N_s-1$ bits binary encode of p, and $\tilde{q}$ is a second value of a second bit reversed version of a second $N_s-1$ bits binary encode of q.

9. A communication method, comprising:
composing $N_c$ sub-carrier signals using a first tree structured filter bank having $N_c$ channels to obtain a composed signal containing the $N_c$ sub-carrier signals; and
decomposing the composed signal using a second tree structured filter bank having $N_c$ channels to obtain the $N_c$ sub-carrier signals,
where vector form transfer function $\vec{H}_{r,p}$ of channel p of the second filter bank is orthogonal to vector form transfer function $\vec{H}_{t,q}$ of channel q of the first filter bank.

10. The communication method of claim 9, wherein:
when p=q, the result of $[\vec{H}_{t,q}]^H \cdot \vec{H}_{r,p}$ equals to 1;
when |p−q|=1, the result of $[\vec{H}_{t,q}]^H \cdot \vec{H}_{r,p}$ is less than a predetermined threshold; and otherwise, the result of $[\vec{H}_{t,q}]^H \cdot \vec{H}_{r,p}$, equals to 0, where $[\ ]^H$ is a conjugate transpose operation.

* * * * *